United States Patent
Erhart et al.

(10) Patent No.: US 9,092,492 B2
(45) Date of Patent: *Jul. 28, 2015

(54) SOCIAL MEDIA IDENTITY DISCOVERY AND MAPPING

(75) Inventors: George Erhart, Loveland, CO (US); Valentine C. Matula, Granville, OH (US); David Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 209 days.

This patent is subject to a terminal disclaimer.

(21) Appl. No.: 13/479,959

(22) Filed: May 24, 2012

(65) Prior Publication Data

US 2012/0303659 A1 Nov. 29, 2012

Related U.S. Application Data

(60) Provisional application No. 61/489,517, filed on May 24, 2011.

(51) Int. Cl.
*G06F 17/30* (2006.01)
*H04L 29/12* (2006.01)
*H04L 29/08* (2006.01)

(52) U.S. Cl.
CPC .... *G06F 17/30554* (2013.01); *H04L 29/12594* (2013.01); *H04L 61/30* (2013.01); *H04L 67/22* (2013.01)

(58) Field of Classification Search
USPC .......................................... 707/705, 706, 784
See application file for complete search history.

(56) References Cited

U.S. PATENT DOCUMENTS

| | | | | |
|---|---|---|---|---|
| 7,263,076 | B1 * | 8/2007 | Leibovitz et al. | 370/310 |
| 8,520,848 | B1 * | 8/2013 | Liu et al. | 380/56 |
| 8,528,053 | B2 * | 9/2013 | Kinsel et al. | 726/4 |
| 8,768,922 | B2 | 7/2014 | Crane et al. | |
| 2002/0100808 | A1 * | 8/2002 | Norwood et al. | 235/486 |
| 2007/0162459 | A1 * | 7/2007 | Desai et al. | 707/10 |
| 2007/0162566 | A1 * | 7/2007 | Desai et al. | 709/219 |
| 2008/0085730 | A1 | 4/2008 | Lovell, Jr. | |
| 2008/0104495 | A1 * | 5/2008 | Craig | 715/205 |

(Continued)

FOREIGN PATENT DOCUMENTS

WO WO 2010/011182 1/2010

OTHER PUBLICATIONS

Silverston "Physically Implementing Universal Data Models to Integrate Data," Information Management, Sep. 2002, 15 pages, http://www.information-management.com/issues/20020901/5675-1.html.

(Continued)

*Primary Examiner* — Baoquoc N To
(74) *Attorney, Agent, or Firm* — Sheridan Ross P.C.

(57) ABSTRACT

A server executing a social media identity and discovery application and method are provided that scan social networking sites for communications. The target content is found with content indicators when communications are put on a social networking site. The content is recorded and evaluated. If the identified content is contextually significant, the alias and the private user data are correlated based on events, and a notification of the correlation is sent to an agent or a contact center system. The agent may verify that the identity of a poster has been accurately correlated with a customer record in the database. The agent or the system has the opportunity to respond to the communication, despite the anonymity of the poster on the social networking site.

20 Claims, 8 Drawing Sheets

(56) References Cited

U.S. PATENT DOCUMENTS

| | | | |
|---|---|---|---|
| 2009/0328173 | A1 | 12/2009 | Jakobson et al. |
| 2010/0191609 | A1* | 7/2010 | Hodgetts et al. ............... 705/26 |
| 2010/0235218 | A1 | 9/2010 | Erhart et al. |
| 2010/0246570 | A1 | 9/2010 | Chavez et al. |
| 2011/0123015 | A1 | 5/2011 | Erhart et al. |
| 2011/0125550 | A1 | 5/2011 | Erhart et al. |
| 2011/0125580 | A1 | 5/2011 | Erhart et al. |
| 2011/0125697 | A1 | 5/2011 | Erhart et al. |
| 2011/0125793 | A1 | 5/2011 | Erhart et al. |
| 2011/0125826 | A1 | 5/2011 | Erhart et al. |
| 2011/0213785 | A1* | 9/2011 | Kristiansson et al. ........ 707/748 |
| 2011/0276513 | A1 | 11/2011 | Erhart et al. |
| 2011/0288897 | A1 | 11/2011 | Erhart et al. |
| 2011/0321129 | A1* | 12/2011 | Kinsel et al. ..................... 726/4 |
| 2012/0005106 | A1* | 1/2012 | Famous ........................ 705/304 |
| 2012/0011208 | A1 | 1/2012 | Erhart et al. |
| 2012/0020471 | A1 | 1/2012 | Erhart et al. |
| 2012/0047012 | A1 | 2/2012 | Pedersen et al. |
| 2012/0051526 | A1 | 3/2012 | Erhart et al. |
| 2012/0072358 | A1* | 3/2012 | Famous et al. ................. 705/319 |
| 2012/0195422 | A1* | 8/2012 | Famous ................... 379/265.09 |
| 2013/0073452 | A1* | 3/2013 | Hodgetts et al. ............... 705/39 |
| 2013/0144785 | A1* | 6/2013 | Karpenko et al. .............. 705/44 |
| 2013/0254170 | A1 | 9/2013 | Erhart et al. |
| 2013/0332592 | A1* | 12/2013 | Kinsel et al. ................. 709/223 |

OTHER PUBLICATIONS

Silverston "A Universal Data Model for Relationship Development," Information Management, Mar. 2002, 14 pages, http://www.information-management.com/issues/20020301/4820-1.html.

International Search Report with Written Opinion for International (PCT) Patent Application No. PCT/US2012/039309, mailed Aug. 8, 2012 13 pages.

Information Management, Physically Implementing Universal Data Models to Integrate Data http://www.information-management.com/issues/20020901/5675-1.html.

Information Management, A Universal Data Model for Relationship Development http://www.information-management.com/issues/20020301/4820-1.html.

International Preliminary Report on Patentability for International (PCT) Patent Application No. PCT/US2012/039309, mailed Dec. 5, 2013 9 pages.

Official Action for U.S. Appl. No. 13/899,286, mailed Jan. 15, 2014 21 pages.

Official Action for U.S. Appl. No. 13/899,286, mailed Jul. 24, 2014 24 pages.

Notice of Allowance for U.S. Appl. No. 13/899,286, mailed Feb. 17, 2015 16 pages.

Notice of Allowance for U.S. Appl. No. 13/899,286, mailed May 22, 2015 8 pages.

* cited by examiner

SOCIAL MEDIA IDENTITY DISCOVERY AND MAPPING

CLAIM OF PRIORITY

This application claims the benefit of U.S. Provisional Application No. 61/489,517, filed May 24, 2011, entitled "SOCIAL MEDIA IDENTITY DISCOVERY," which is hereby incorporated by reference in its entirety.

BACKGROUND

People exchange information or provide commentary about business services or products on social media or social networking sites like Twitter, Facebook, Flickr, LinkedIn, MySpace, Pinterest, Spoke, YouTube, Blogs, RSS, search sites (Google, Bing, etc.), etc. Generally, a user of the social networking site employs an alias to mask his or her identity. Thus, social networking sites generally inhibit identifying a user. Comments can be made anonymously, often prompting a user to be forthright and candid about interactions with companies without fear of reprisal or consequence. For example, a consumer John Smith may use the alias "RocknRoll" on a social media site and complain about bad service at "Music World." Unless John chooses to reveal his real name, it can be extremely difficult to determine John's identity from the alias RocknRoll. Mapping that alias to a known customer of a company based on a specific transaction may not be possible. When people use social networking sites to comment negatively about business transactions, a company has a vested interest in identifying these users and addressing issues quickly and directly. Negative comments about service and products can seriously hurt or even ruin a business. The inability to determine the identity of a user presents a challenge to addressing the problem directly.

SUMMARY

The present invention is generally directed to a system and method for mapping a person's identity to an alias on a social networking site. A system includes a server running an application that crawls public data sources to find a topic of interest to a company. Once the topic of interest is identified, a subset of relevant data is collected. The relevant data is compared to information that comes from an identifiable source. In response to a match, the application assigns the identification from a known user to the topic of interest.

The system would typically include a contact center and a network able to communicate with one or more social networking sites and connected to one or more databases, which may be either public or proprietary. Information on proprietary company transactions and users might come from a private database internally or externally connected to the contact center and be processed by a server. A server or human agent from the contact center might initiate contact with a person through a communication device, which could be a user's cell phone, email system, laptop computer, or other device.

When the server executes the application, the application scans key words, terms, topics, and other context data out in the public domain. Context data associated with the alias might include items like order history, transactions, profile information, etc. which may be compared to private user data. The text may be analyzed for topic content by means of clustering, latent semantic indexing, or other known methods. Items passing threshold values or other indicators may be stored and queued for validation. The alias may be identified as a customer when correlated to one or more events stored in private user data. Correlations may be passed on to a system or human agent for validation and processing. Direct contact may be made depending on the context of a post.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the invention. Rather, the ensuing description will provide those skilled in the art with an enabling description for implementing the embodiments. Various changes may be made in the function and arrangement of elements without departing from the spirit and scope of the invention as set forth in the appended claims.

Figure 1:
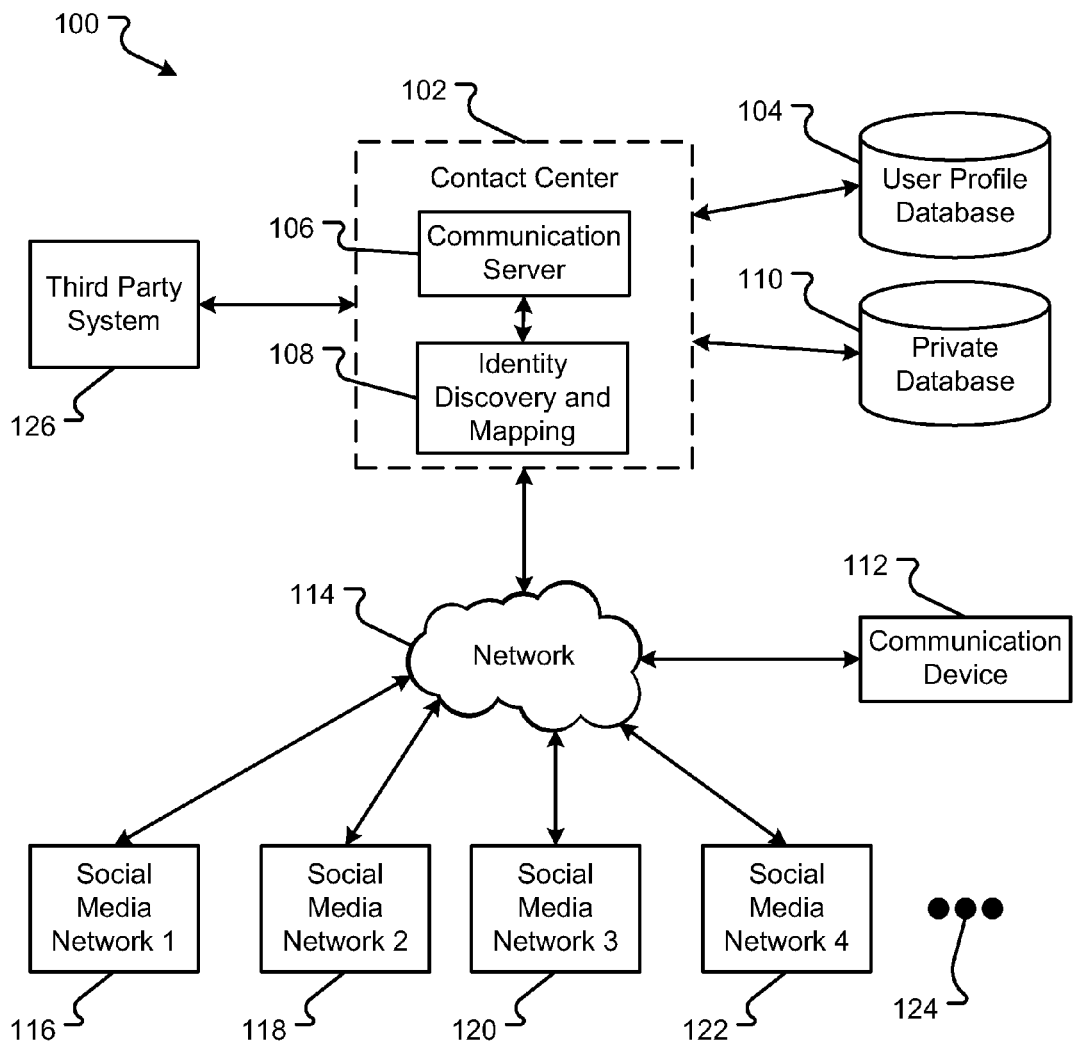
FIG. 1 is a block diagram of an embodiment of a contact center, including a communication system, operable to interact with persons posting a communication on a social networking site and with databases containing user information.

A communication system 100, for interacting with persons using social networking sites, is shown in FIG. 1. A social networking site can be an Internet site or a distributed network resource. The phrase "distributed network resource" as used herein refers to any resource that is an asset that produces benefit that may be located on more than one computer and connected via a network.

The communication system 100 can include a contact center 102, a network 114, and one or more social networking sites, such as social networking site 1 116, social networking site 2 118, social networking site 3 120, and social networking site 4 122. Social networking sites 116, 118, 120, or 122 can be any social networking site or system. The communication system 100 can communicate with more or fewer social networking sites 116, 118, 120, or 122 than those shown FIG. 1, as represented by ellipses 124. The phrase "social media site" or "social networking site" as used herein refers to web-based technologies used to turn communication into interactive dialogue between organizations, communities, and individuals. Common forms of social media sites or social networking sites include, for example, collaborative projects (e.g., Wikipedia), blogs and micro blogs (e.g., Twitter), content communities (e.g., YouTube), social networking sites (e.g., Facebook), virtual game worlds (e.g., World of Warcraft), and virtual social worlds (e.g. Second Life).

The communication system 100 connects to a network 114. The network 114 may be any type of network familiar to those skilled in the art that can support data communications using any of a variety of commercially-available protocols, including without limitation SIP, TCP/IP, SNA, IPX, AppleTalk, and the like. Merely by way of example, the network 114 may be a local area network ("LAN"), such as an Ethernet network, a Token-Ring network and/or the like; a wide-area network ("WAN"); a virtual network, including without limitation a virtual private network ("VPN"); the Internet; an intranet; an extranet; a public switched telephone network ("PSTN"); an infra-red network; a wireless network (e.g., a network operating under any of the IEEE 602.11 suite of protocols, the Bluetooth™ protocol known in the art, and/or any other wireless protocol). The network 114 can be any network or system operable to allow communication between the contact center 102 and the one or more social networks 116, 118, 120, or 122. The network 114 can represent any communication system whether wired or wireless using any protocol or format.

In embodiments, the network 114 provides communication capability for the contact center 102 to communicate with the one or more social networking sites 116, 118, 120, or 122 and a communication device 112. However, the network 114 can represent two or more networks, where each network is a different communication system using different communication formats or different hardware and software.

The phrase "contact center" as used herein refers to a facility used by companies to manage client contacts made through a variety of mediums such as telephone, fax, letter, e-mail, and online chat. The majority of large organizations use contact centers as a means of managing their client interactions. Further, the contact center 102 can be a system that can communicate with one or more persons that use social networking sites. The contact center 102 can be hardware, software, or a combination of hardware and software.

In embodiments, the contact center 102 may include all systems whether hardware or software that allow the contact center 102 to respond to directed contacts. For example, the contact center 102 can include one or more of, but is not limited to, call or email systems, interfaces to human agents, systems to allow agents to respond to received contacts, one or more systems operable to analyze and improve the function of agent interaction, and/or databases.

In embodiments, the contact center 102 includes a communication server 106 running an application for identity discovery and mapping 108. While the communication server 106 and the application for identity discovery and mapping 108 are shown as being a part of the contact system 102, in other embodiments, the communication server 106 and/or the application for identity discovery and mapping 108 may be separate systems or functions may be executed separately from the contact center 102 or executed by a private company or third party. The phrase "third party" as used herein refers to any person or company not directly tied to an organization.

In embodiments, a communication server 106 executing the application 108 is operable to crawl social networking sites to detect relevant communications and correlate communications to private user database data. The term "crawl" as used herein refers to any known or created computer application that is able to automatically browse World Wide Web sites. Based on policies, the application is able to search for text and collect specific information from one or more World Wide Web sites and it may be stored for further evaluation.

The application for identity discovery and mapping 108 may determine which communications are significant, discard insignificant communications, and correlate communications to private user data. An embodiment of the application for identity discovery and mapping 108 is as described in conjunction with FIG. 2.

If the identity of a user's alias is known, the contact center 102, in embodiments, can modify a non-direct contact, from a social networking site 116, 118, 120, or 122, into a directed contact by sending a response message directly to a customer's communication device 112. The communication device 112 can represent a customer or user's cell phone, email system, personal digital assistant, laptop computer, or other device that allows the contact center 102 to interact with the customer. The term "alias" as used herein refers to a pseudonym, which is a name that a person or group assumes for a particular purpose, which differs from his or her original or true name. Pseudonyms are often used to hide an individual's real identity. The term "identity" as used herein refers to a person's original or true name which can be associated with other real or true facts that identify that real person.

The contact center 102 may also communicate with one or more private databases 110 and/or user profile databases 104. These may be located within the contact center 102 or in other locations.

Figure 2:
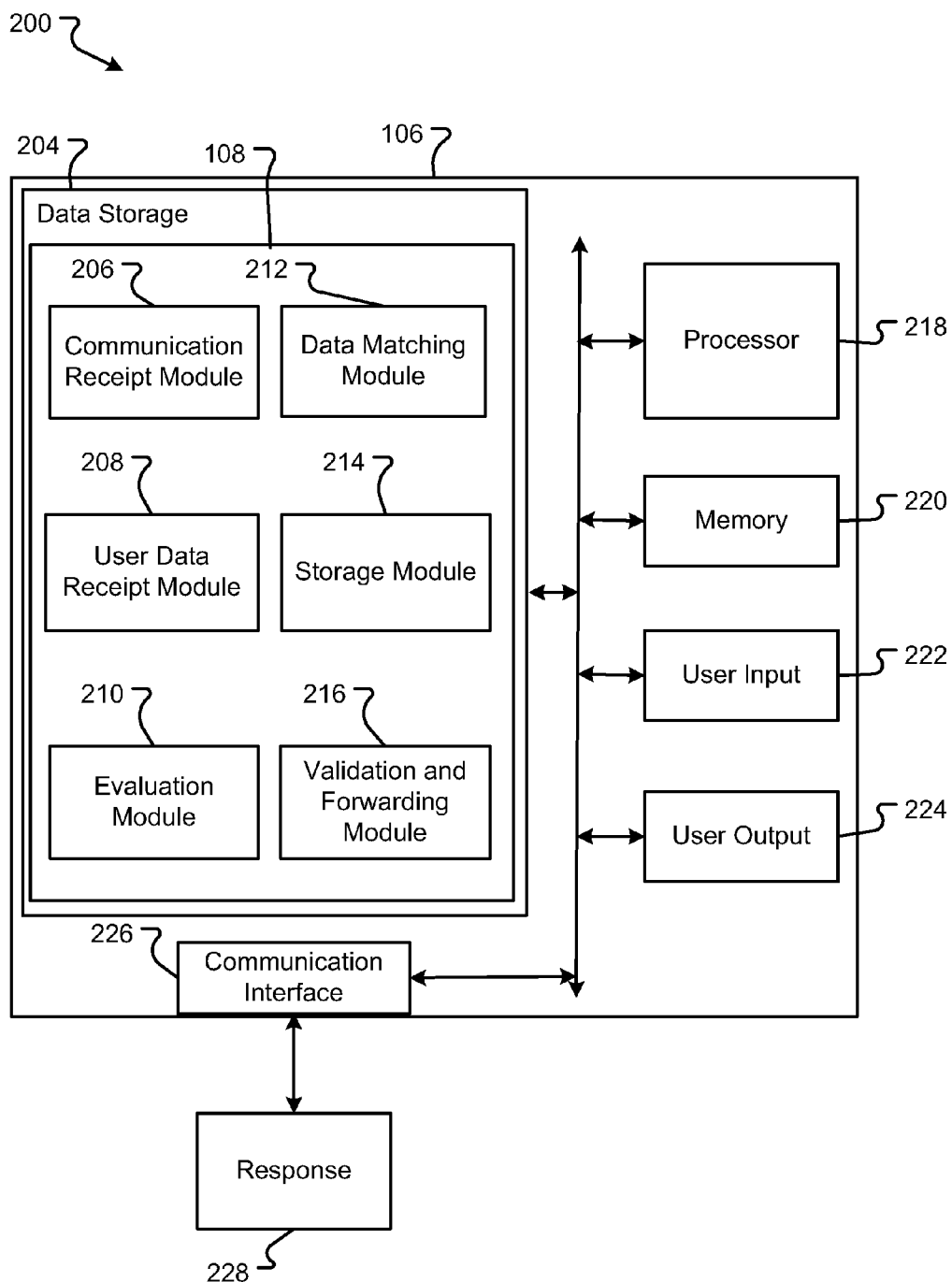
FIG. 2 is a block diagram of an embodiment of a identity and discovery mapping system.

An embodiment of a communication server 106 running an application for identity discovery and mapping 108 is shown in FIG. 2. The communication server 106 can be running any operating system on any commercially-available server hardware. The communication server 106 can also run a variety of server applications, including SIP servers, HTTP servers, FTP servers, CGI servers, database servers, Java servers, and the like. The communication server 106 may include a processor 218, user input 222, user output 224, and a communication interface 226. The communication server 106 is able to communicate with other elements via the communication interface 226 which may be a Programmable Communication Interface ("PCI"), Network Interface Controller ("NIC"), Serial Advanced Technology Attachment ("SATA"), a Firewire (IEEE 1394), a Universal Serial Bus ("USB"), or any other type of communication interface. Data storage 204 and memory 220 may be disk drives, optical storage devices, solid-state storage devices such as a random access memory ("RAM") and/or a read-only memory ("ROM"), which can be programmable, flash-updateable and/or the like.

The phrase "application" as used herein refers to computer software or hardware designed to help the user to perform specific tasks. Applications may be part of computer system software or hardware or may be separate software or hardware that can be added. An application can manipulate text, numbers, graphics, or a combination of these elements.

The application for identity discovery and mapping 108 may be run on a communication server 106 in the contact center 102 or on a server completely outside of the shown devices which is able to communicate with the contact center 102. The communication server 106 executes the application for identity discovery and mapping 108, which contains modules within the server 106 for correlating communications from social networking sites 116, 118, 120, 122 to private user data. The modules may run as a single application or the modules may be executed as discrete modules. The application for identity discovery and mapping 108 may include one or more of, but is not limited to, a communication receipt module 206, a user data receipt module 208, an evaluation module 210, a data matching module 212, a storage module 214, and/or a validation and forwarding module 216.

The phrase "the communication" as used herein refers to any post or discrete entry on a social media site or social networking site. The communication can include, for example, text, images, links, photographs, graphics, or any representation that may be allowed by a site.

The communication receipt module 206 receives the communications from the social networking sites 116, 118, 120, and 122. The communication receipt module 206 may parse the communication, storing communication data. The communication receipt module 206 can parse multiple types of data from a communication, including but not limited to metadata and contextual information. The user data receipt module 208 can receive user information from a third party system 126, from the contact center 102, or from one or more other internal or external sources. The user data receipt module 208 may parse the user information, storing user data. The user data receipt module 208 can interpret multiple types of data from sources, including but not limited to user name, account number, and event information.

The evaluation module 210 receives parsed communication information from the communication receipt module 206 and parsed user information from the user data receipt module 208. The evaluation module 210 may also receive and/or store preset thresholds. A threshold may include heuristics to determine if a communication or communications associated with an alias should be ingested and correlated. The term "content indicator" as used herein refers to any key word, topic, subject, location, domain, or classification. A communication should be ingested based on one or more of, but not limited to, how many communications are identified with a content indicator (for example, three messages about the same data), a confidence interval (for example, statistics regarding the social networking site data), the number of content indicators found in a single communication, and/or the number of correlations from different communications on related data. Once the information and thresholds are received, the evaluation module 210 tests the information against the thresholds. The evaluation module 210 may store tested information that passes the thresholds that will be accessed by the data matching module 212. The evaluation module 210 may optionally store communications that do not pass the thresholds for additional testing with new parsed information.

The data matching module 212 may ingest parsed information from the communication receipt module 206 and the user data receipt module 208 that has passed thresholds in the evaluation module 210. The data matching module 212 may then execute a matching algorithm on the information stored by the evaluation module 210. The data matching module 212 may determine one or more correlations between communication data and private user data. The terms "correlate" or "correlation" as used herein refers to a relationship that involves some type of dependence, where dependence refers to a relationship between two random variables or two sets of data. If a correlation or correlations are determined, the data matching module 212 may store the correlation for further evaluation. If no correlation is determined, the data matching module 212 may attempt a further or more refined correlation with the additional parsed communications. The data matching module 212 may optionally compare a validated first alias to a second alias from a second social networking site 116, 118, 120, 122.

The storage module 214 receives data from the data matching module 212. The storage module 214 may store correlations that are determined by the matching algorithm. These correlations may be one or more matches of parsed communications to parsed private user data. The storage module has the capability to store the data in individual data entries or in groups of related data entries. The validation and forwarding module 216 contains policies that check the validity of the correlations determined by the data matching module 212. If the correlation is determined to be valid, the validation and forwarding module 216 may refer the correlation to an agent in the contact center 102. An agent may be an automated process or a human agent that completes an action. The agent can determine if further action is required on the correlation. If no action is required, no additional work is done by the agent. If action is required, the agent may determine if additional validation is required. If validation is not required, the communication system 100 may execute an action. For example, the communication system 100 contacts the identified user via the alias. If validation is required, the agent may execute an action. The agent can validate the correlation and send a response 228 to the identified user via the alias. The application for identity and discovery and mapping 108 enables the matching of the communication social networking site aliases to user data, and allows an agent to create or a system to automate a response 228 based on the correlation.

Figure 3:
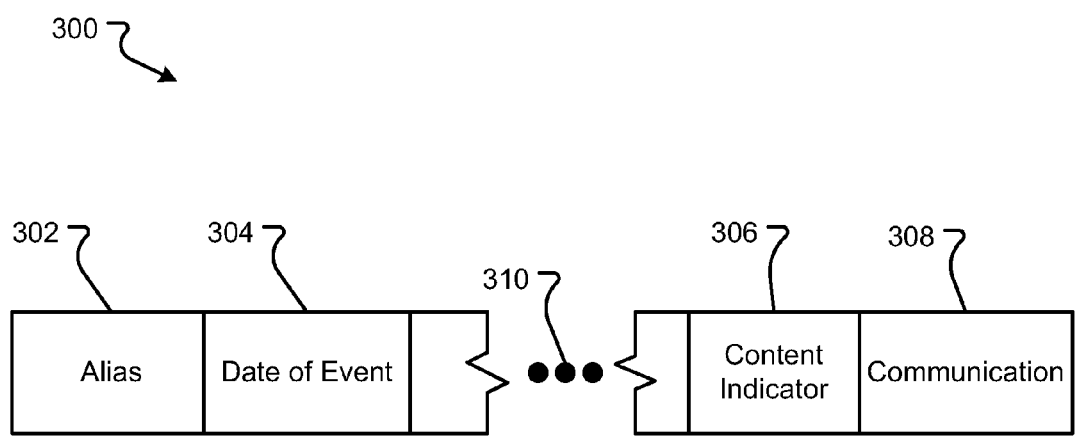
FIG. 3 is a data diagram of an embodiment of data that is received from a social networking site.

A social networking site communication data structure 300 is shown in FIG. 3. The communication data structure 300 can be a data structure that models a communication from a user of a social networking site 116, 118, 120, and 122. The communication data structure 300 can be a data structure that stores one or more items of information in one or more data fields. The numeric identifiers shown in FIG. 3 can identify either the data field or the data stored in the data field. The communication data structure 300 can be stored in several different forms of databases, such as relational databases, flat files, object-oriented databases, etc. Thus, while the term "data field" is used, the data may be stored in an object, an attribute of an object, or some other form of data structure. Further, the communication data structure 300 can be stored, retrieved, sent or received during the processing of user identities by the communication receipt module 206 or the data matching module 212.

In embodiments, the database 300 may include specific information from a social networking site communication. The data 300 may include metadata. This metadata may include the alias of the user 302. It may also include the date of the event 304 associated with content indicators or correlations. The database information may include the content indicators 306 that identified the communication as relevant. The database information may include a portion of or all of the communication 308 that was stored in response to the content indicator match. The data may be more or fewer data entries 302, 304, 306, or 308 than those shown FIG. 3, as represented by ellipses 310. Alias, date, and content indicator fields 302, 304, and 306 can include information required by the identity discovery and mapping application 108 to identify a user that may have posted a communication to one or more social networking sites 116, 118, 120, and 122. While there are only four input fields 302, 304, 306, and 308 shown in FIG. 3, there may be more or fewer data fields associated with data structure 300, as indicated by ellipses 310.

The communication data structure 300 can include one or more input fields which represent one or more aliases for a user 302, a date of event field 304 (which can mark the actual date and time that a communication was entered on a social networking site), a content indicator field 306 (which can contain contextually relevant communication information that can be correlated to other data), and a communication field that can contain all or part of one or more communications from one or more social networking sites 116, 118, 120, and 122. The input field 302 may include an alias, which may be an alpha or alphanumeric name (e.g., "RocknRoll," "Coolbreeze123," etc.). Social networking sites 116, 118, 120, and 122 may have different requirements for the alias 302. The communication data structure 300 may contain additional fields to store these for comparison and correlation.

The communication field 308 can include one or more interactions required of the identity discovery and mapping application 108 in order to assist with a response 228. If a correlation is made using the alias 302, the content indicator 306, and the communication 308 fields, the communication field 308 may include information about how to respond to a user. This response message 228 may be provided by the contact center 102 and may be automatically sent or the response 228 may be sent by a human agent.

Figure 4:
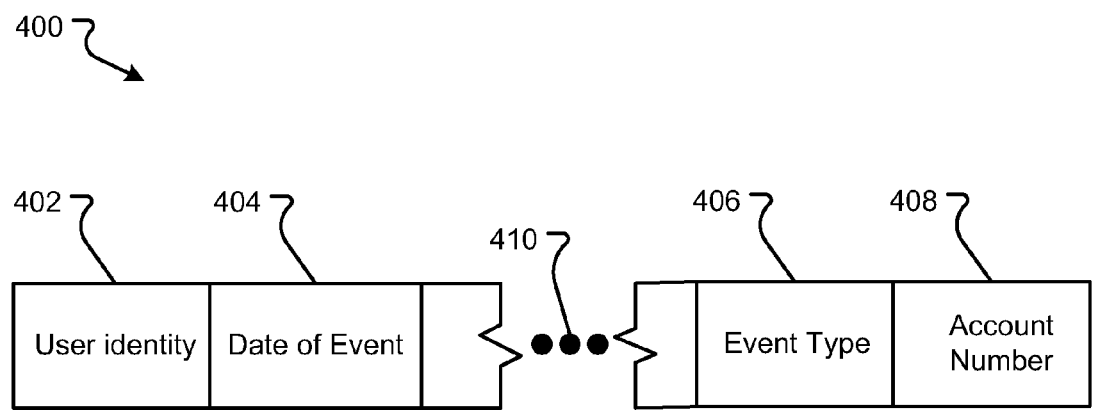
FIG. 4 is a data diagram of an embodiment of data that is received from a private data source.

An embodiment of private data 400 is shown in FIG. 4. The phrase "private data" as used herein refers to a collection of personally identifiable information that is stored by an organization. Private data can include, for example, a person's name, a person's address, a person's account number, a history of a person's financial transactions, a history of items purchased, a list of any type of events or interactions with an organization, and the dates of those events.

In embodiments, the private data 400 may include specific information from interactions with a third party, a direct customer of the contact center, or other users or private data sources. The private data 400 may include metadata. This metadata may include the user identity 402. It may also include the date of an event 404 that may be associated with social media communications that are in temporal proximity to the event. The database information may include the event type 406 based on the domain parameters. The database information may also include an account number or other specific customer identifier 408 that has been stored in response to an interaction with a company or a contact center. While there are only four input fields 402, 404, 406, and 408 shown FIG. 4, there may be more or fewer data fields associated with data structure 400, as indicated by ellipses 410.

The event type data field 406 can include one or more pieces of information required by the identity discovery and mapping application 108 to assist with a response 228. If a match is made using the social networking communication data 300, the stored information may include event information important in a response to a user. The response message may be provided by the contact center 102 and may be automatically sent or sent by a human agent.

Figure 5:
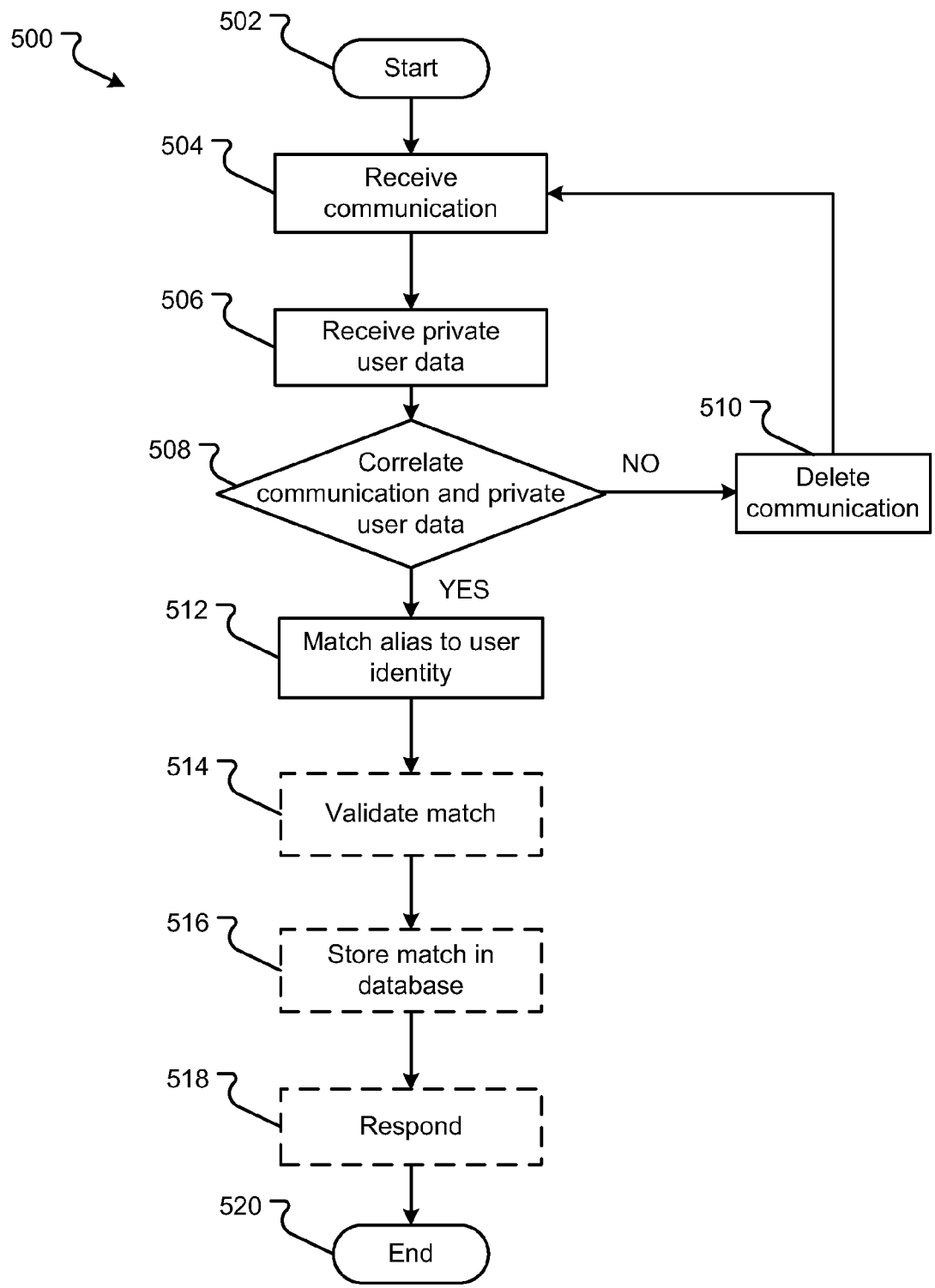
FIG. 5 is a flow diagram of an embodiment of a process for identifying users based on information from social networking sites mapped to private data.

A method 500 for mapping an alias to a user identity is shown in FIG. 5. Generally, the method 500 begins with a start operation 502 and terminates with an end operation 520. While a general order for the steps of the method 500 are shown in FIG. 5, the method 500 can include more or fewer steps or the order of the steps can be arranged differently than those shown in FIG. 5. Additionally, some of the steps represented by dotted lines may be optional. The method 500 can be executed as a set of computer-executable instructions executed by a computer system and encoded or stored on a computer readable medium. The term "computer-readable medium" as used herein refers to any tangible storage that participates in providing instructions to a processor for execution. Such a medium may take many forms, including but not limited to, non-volatile media, volatile media, and transmission media including, for example, NVRAM, magnetic or optical disks, dynamic memory, such as main memory, computer-readable memory like a floppy disk, a flexible disk, hard disk, magnetic tape, or any other magnetic medium, magneto-optical medium, a CD-ROM, any other optical medium, a RAM, a PROM, and EPROM, a FLASH-EPROM, a solid state medium like a memory card, any other memory chip or cartridge. When the computer-readable media is configured as a database, it is to be understood that the database may be any type of database, such as relational, hierarchical, object-oriented, and/or the like. Hereinafter, the method 500 shall be explained with reference to the systems, components, modules, software, data structures, etc. described in conjunction with FIGS. 1-4.

The communication receipt module 206 may receive the first communication associated with the social networking site 116, in step 504. Private data may be received by the user data receipt module 208, in step 506. The evaluation module 210, the data matching module 212, the storage module 214, or one or more components of the application for identity discovery and mapping 108 may then correlate the received communication to private data using the data matching module 212, in step 508.

If a correlation is not made, the application for identity discovery and mapping 108 may then delete the communication, in step 510. If a correlation is made, the application for identity discovery and mapping 108 may then match the alias 302 to the user identity 402, in step 512. The correlation may be stored in a database by the storage module 214, in step 516. The correlation may also be validated by the validation and forwarding module 216 and forwarded for a response 228 by the contact center system 102 or a human agent, in step 512. The storage module 214 provides specific information from the social networking communication and the private user data to assist the contact center system 102 or the human agent so that the contact center system 102 or the human agent can respond 228 to the communication, in step 518.

Figure 6:
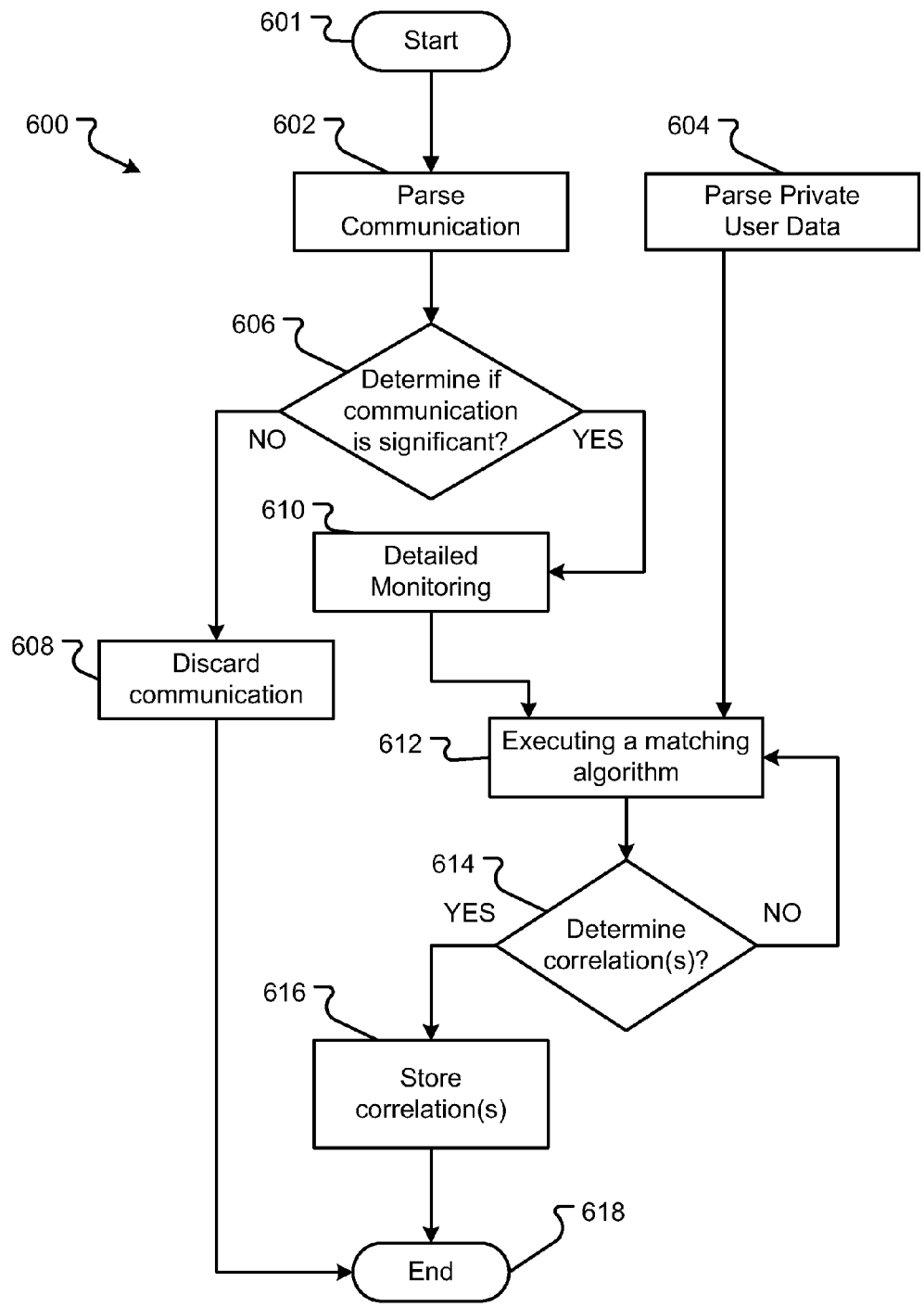
FIG. 6 is a flow diagram of an embodiment of a process for matching a communication to an alias.

A method 600 for determining whether or not a communication is significant is shown in FIG. 6. Generally, the method 600 begins with a start operation 601 and ends with an end operation 618. While a general order for the steps of the method 600 are shown in FIG. 6, the method 600 can include more or fewer steps or the order of the steps can be arranged differently than those shown in FIG. 6. The method 600 can be executed as a set of computer-executable instructions executed by a computer system and encoded or stored on a computer readable medium. Hereinafter, the method 600 shall be explained with reference to the systems, components, modules, software, data structures, etc. described in conjunction with FIGS. 1-5.

The communication receipt module 206 may parse the communication, in step 602. The user data receipt module 208 may parse the private user data, in step 604. The communication is evaluated for contextual relevance, in step 606. If the communication is determined not to be contextually relevant, it is discarded, in step 608. If the communication is determined to be contextually relevant, it is sent on for detailed monitoring, in step 610. This detailed monitoring step 610 may include evaluating the history of the communication alias 302. Additional communications from this alias 302 may be identified and parsed for evaluation. Subsequent to this detailed monitoring, the parsed communication that has been determined as contextually relevant may be sent to the data matching module 212. The parsed private user data from step 604 may also be sent to the data matching module 212. The data matching module 212 then executes a matching algorithm to determine if the communication data matches the private user data, in step 612. The matching could include a correlation 614 with the metadata (for example, date of event and location of event, like travel in July to Greece), a correlation 614 with a content indicator (for example, airplane, flight, hotel, etc.), a correlation 614 with the natural language of the communication (for example, I took a Lufthansa flight and it seemed to take forever.), and other data proffered by the alias 302. The matching algorithm 612 may determine a correlation 614 between one or more communications and the private user data. Once a correlation is determined, in step 614, a positive correlation is stored by the storage module 214, in step 616. If a correlation is not determined in step 614, the data may be returned to attempt an additional match by executing the matching algorithm 612 with additional communication data.

Figure 7:
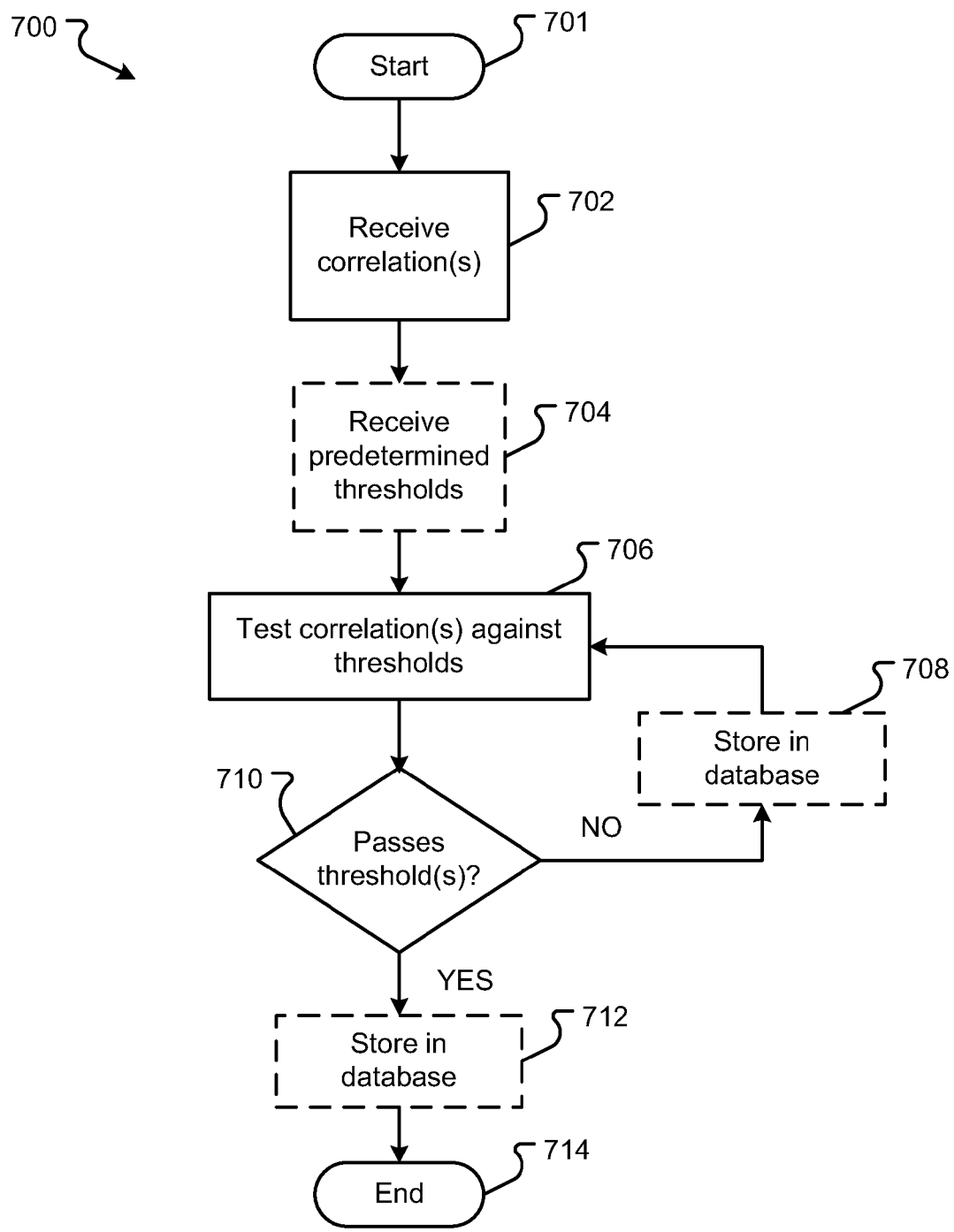
FIG. 7 is a flow diagram of an embodiment of a process for validation.

A method 700 for determining if a communication passes certain thresholds is shown in FIG. 7. Once the thresholds have been tested and the data passed, the correlations can be stored for use as shown in FIG. 7. Generally, the method 700 begins with a start operation 701 and ends with an end operation 714. While a general order for the steps of the method 700 are shown in FIG. 7, the method 700 can include more or fewer steps or the order of the steps can be arranged differently than those shown in FIG. 7. The method 700 can be executed as a set of computer-executable instructions executed by a computer system and encoded or stored on a computer readable medium. Hereinafter, the method 700 shall be explained with reference to the systems, components, modules, software, data structures, etc. described in conjunction with FIGS. 1-6.

The validation and forwarding module 216 may receive the stored correlation(s) in step 702. The validation and forwarding module 216 may also receive a set of predetermined thresholds, in step 704. A threshold may include an indication of how many communications are identified with a content indicator (for example, three messages about the same data), a confidence interval (for example, statistics regarding the social networking site data), the number of content indicators found in a single communication, and the number of matches from different communications on related data (for example, multiple posts on a trip from Los Angeles to Africa within the same month). Once the correlations and thresholds are received, the correlations are tested against the thresholds, in step 706. The test may include evaluating one or more of the thresholds listed above or any other predetermined thresholds. The tests may be executed for multiple thresholds at once or executed any number of times to determine a pass or fail. If the correlation does not pass the threshold (for example, the user went to Egypt, but in the wrong month, only a single communication matches the private data, etc.), the communication may be stored for additional evaluation with other data. If a correlation does pass a threshold, the alias of the communication is associated with the user identity and marked as a correlation and stored in a database 104, in step 712. Additional correlations may be identified, grouped, and stored 712 for evaluation.

Figure 8:
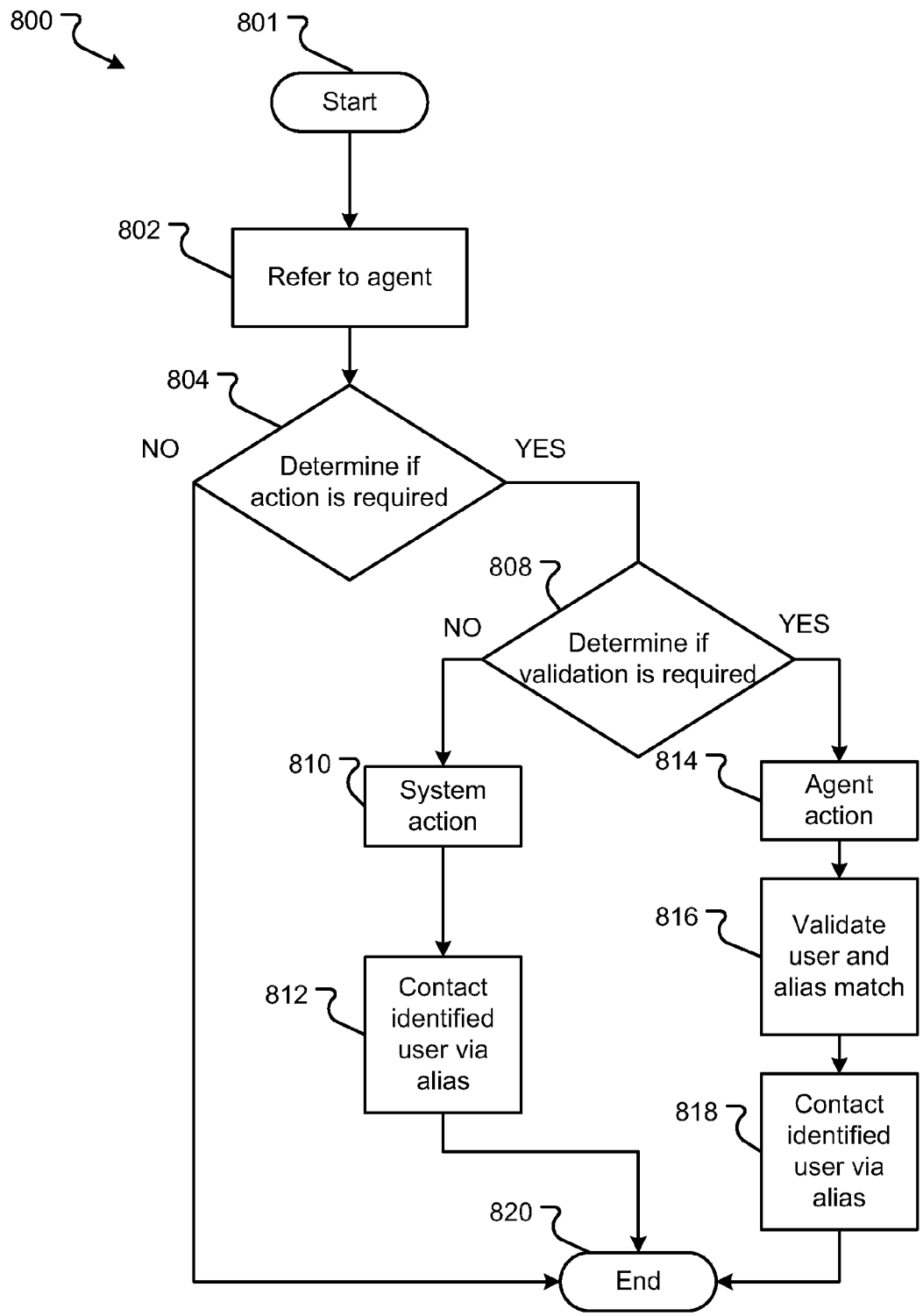
FIG. 8 is a flow diagram of an embodiment of a process for determining if action is required.

The method 800 for responding to the communication is shown in FIG. 8. Generally, the method 800 begins with a start operation 801 and terminates with an end operation 820. While a general order for the steps of the method 800 are shown in FIG. 8, the method 800 can include more or fewer steps or the order of the steps can be arranged differently than those shown in FIG. 8. The method 800 can be executed as a set of computer-executable instructions executed by a computer system and encoded or stored on a computer readable medium. Hereinafter, the method 800 shall be explained with reference to the systems, components, modules, software, data structures, etc. described in conjunction with FIGS. 1-7.

The validation and forwarding module 216 may refer the match of the alias 302 and user identity 402. Once the match is referred to a human agent, in step 802, a determination is made as to whether or not an action may be required, in step 804. If no action is required, the method ends at step 820. If action may be required, the human agent can make an assessment as to whether the correlation is good, in step 808. If the correlation is good and requires no additional validation, the data can be sent to the contact center system 102 to execute a response 228, in step 810. The system action may be an automated contact to the user via his or her alias 302 or to the user's known communication device 112, in step 812. The response 228 could include an advertisement, a coupon, an expression of thanks, an outcall from an interactive voice response system, and any other predetermined message via any means including an email, a voice call, a written communication on the social networking site, an instant message, or any other type of contact.

If the correlation appears to require additional validation in step 808, the human agent may take action, in step 814. The agent action may be to review the communication data and the private user data previously collected, it may be to manually review other communications posted by the alias 302, it may be to review other private user data 400, or any action taken by the human agent to validate the correlation, in step 816. Once the human agent has validated the correlation, the agent action may initiate contact with the user via his or her alias 302 or communication device 112, in step 818.

It is with respect to the above issues and other problems that the embodiments presented herein were contemplated. Other variations and specific applications are possible based on this invention, including, but not limited to, use cases for industries including travel, healthcare, retail, and university.

In an additional embodiment, the identity and discovery mapping application could be used for a retail company. For the retail industry, words such as "retail," "supply," "shop," "product," "buying," "merchandise," "returns," etc. may be monitored. If a user posts that they returned one thing one day and then posts that they are shopping online for something else the next day or next time period, the posts may be flagged as pertaining to retail. The person's alias is recorded and monitored. Indication of retail transactions are identified, e.g., "I just bought my favorite movie on Blu-ray." Then, those posts, with the metadata and context from the posts, are parsed to compare to internal data. Poster X, who bought a wedding dress on date X and a veil on date Y, is likely Darla Fox, who made the same purchases on those days. With a sufficiently close match, the alias is stored with the private user data. The closeness of the match can be determined through known statistical modeling. If the posts were negative, a system or agent could call or email the purchaser, offer to help with the issue, offer a discount or refund, or perform any action that might curtail any additional negative posts by the user.

In an additional embodiment, the identity and discovery mapping application could be used for the healthcare industry. For the healthcare industry, words such as "procedure," "hospital," "illness," "surgery," "medical," "examination," "treatment," etc. may be monitored. If a user posts that they went for a procedure one day and then posts that they are going in for a follow-up in the next week or next time period, the posts may be flagged as pertaining to healthcare. Indication of healthcare transactions may be flagged, e.g., "I just finished my thirteenth chemo treatment." Those posts, with the metadata and context from the posts, are parsed to compare to private user data. The context data may be items like order history of customers, transactions, profile information, etc. If there is enough past history of a customer, then looking for and waiting for new posts or interaction may not be needed as the identity of the person can be determined from past events. Poster X, who bought insurance on date X and had a call to add dependents on date Y, is likely Robin Elliston, who made the same purchases on those days. If the posts were negative, a system or agent could call or email the patient, healthcare worker, or purchaser, offer to help with the issue, offer a follow-up, give advice on a health issue, or perform any action that might curtail any additional negative posts by the user.

In an additional embodiment, the identity and discovery mapping application could be used in a university setting. For universities, deciding to use social media may be a foregone conclusion. A recent study showed that 100% of universities have a Social Media presence (The Center for Marketing Research at the University of Massachusetts Dartmouth). From inviting potential new students with admissions blogs to keeping alumni engaged via Facebook and Pinterest, to informing students about campus offerings and issues through Twitter feeds and YouTube videos, it's clear that universities recognize the importance of social media. It's also critical that universities set specific guidelines. These guidelines can include things like account naming conventions, crisis response policies, copyright and legal reminders, federal requirements, and descriptions of the core principles driving the university's Social Media strategy, such as authenticity and transparency. For a university, words such as "<school name>," "<mascot name>," "admissions," "financial aid," "enrollment," "graduation," and "alumni" may be monitored. If a student made comments about a class, grades, or a professor a year ago, past class schedules and records can be reviewed. A university indicator is compared to internal data that indicates what people were in a class that was the same as the poster. For example, which people were in Organic Chemistry on date X. The context data may be items like registration, grades, profile information, transcripts, etc. Poster X, who posted about the Chemistry class on date X and had a post about the professor and grades on date Y, is likely Clayton Weaver, who was in that class at that time with a certain grade. If the posts were negative, a system or agent could call or email the student or staff member, offer to help with the issue, invite a dicourse to discourage bad or disruptive behavior, or perform any action that might curtail any additional negative posts by the user.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A non-transitory computer readable medium having stored thereon computer-executable instructions, the computer executable instructions causing a processor to execute a method for analyzing an interaction between a social media networking site and a contact center, the computer executable instructions comprising:
   one or more instructions to receive a communication from the social networking site, the communication further comprising indicia of a post on the social networking site, and the communication including an alias;
   one or more instructions to receive private user data from a private user data source, the private user data including an identity for a user;
   one or more instructions to identify at least one of a content indicator in the communication and a content indicator associated with the private user data;
   one or more instructions to correlate the alias with a user associated with the private user data by correlating the content indicator in the communication and the content indicator associated with the private user data;
   one or more instructions to validate the correlation by comparing the private user data with at least one other communication having the alias;
   one or more instructions to store a validated alias in a user profile database;
   one or more instructions to compare the validated alias to a stored alias;
   one or more instruction to correlate the validated alias to the stored alias; and
   based on a correlation, of the validated alias to the stored alias, one or more instructions to indicate a match of the alias to the identity of the user.

2. The computer readable medium of claim 1, wherein the instructions to receive the communication comprise at least one of instructions to crawl communications associated with the social networking site or receive the communication from the social networking site.

3. The computer readable medium of claim 1, wherein the instructions to receive the private user data comprises one of instructions to query a database for the private user data or receive the private user data from a private user data system.

4. The computer readable medium of claim 1, wherein the instructions to correlate the communication with the private user data comprise:
   instructions to identify a content indicator in the communication;
   instructions to identify a date, an event type, or a similarity to the content indicator in the private user data; and
   determine that the communication is related to the private user data.

5. The computer readable medium of claim 1, further comprising instructions to delete the communication if no correlation is made.

6. The computer readable medium of claim 1, further comprising in response to the correlation, instructions to validate the correlation based on a comparison with at least one other communication.

7. The computer readable medium of claim 1, wherein a validated correlation between the user identity and the alias is stored in a user profile database.

8. The computer readable medium of claim 1, wherein a response to the validated correlation is sent, wherein the response includes personal data about the user.

9. A communication system comprising:
   A server in a contact center executing an identity discovery and mapping application, the identity discovery and mapping application operable to receive a communication from a social networking site, the communication further comprising indicia of a post on the social networking site,
   wherein the identity discovery and mapping application comprises:
   a communication receipt module operable to receive the communication from the social media networking site;
   a customer data receipt module operable to receive user data from a private user data source;
   an identification module operable to identify at least one of a content indicator in the communication and a content indicator associated with the user data;
   an evaluation module in communication with the communication receipt module and the customer data receipt module that determines a correlation between the communication and private user data by determining a correlation between the content indicator of the communication and the content indicator associated with the user data from the private user data source;

a data matching module in communication with the evaluation module that matches a user identity from the private user data with an alias associated with the communication; and a validation and forwarding module that checks the validity of correlations determined by the data matching module;

a storage module configured to store a validated alias in a user profile database;

a comparison module configured to compare the validated alias to a stored alias;

instructions to correlating the validated alias to the stored alias; and wherein the validation and forwarding module forwards a communication associated with the alias, wherein the response includes the private user data.

10. The system of claim 9, wherein the contact center is in communication with at least one of the social networking site, the private user data source, a private database, and a user profile database.

11. The system of claim 9, wherein the social networking site can be one or more of a resource on the Internet or a distributed network resource.

12. The system of claim 9, wherein the communication can be one or more of information from the resource on the Internet or the distributed network resource, a tweet, a blog, an instant message, and an RSS feed.

13. The system of claim 9, wherein private user data can be one or more of a user name, a user account number, a date of event, a name of event, or an event type.

14. The system of claim 9, further comprising a communication receipt module performing communication filtering when a content indicator has been detected, wherein a special handling is invoked.

15. The system of claim 9, further comprising sending a notification of a correlation for taking action in response.

16. A method for matching an alias with a user in a database, the method comprising:

receiving by a processor a communication from a social networking site, the communication further comprising indicia of a post on the social networking site;

receiving by the processor private user data from a private user data source;

identifying by the processor at least one of a content indicator in the communication and a content indicator associated with the private user data;

in response to the identifying step, correlating by the processor an alias in the communication to a user associated with the private user data;

validating by the processor the correlation by comparing the private user data with at least one other communication having the alias;

storing by the processor a validated alias in a user profile database;

comparing the validated alias to a stored alias;

correlating the validated alias to the stored alias; and responding by the processor to a third communication associated with the alias, wherein the response includes the private user data.

17. The method of claim 16, wherein the social networking site can be one or more of a resource on the Internet or a distributed network resource.

18. The method of claim 16, wherein the communication can be one or more of information from the resource on the Internet or the distributed network resource, a tweet, a blog, an instant message, or an RSS feed.

19. The method of claim 16, wherein the correlation is based on one or more of the content indicator in the communication, correlated to a date or an event type or similarity to the content indicator in the private data.

20. The method of claim 16, further comprising validating and acting on the communication by a system or an agent in response to the correlation.

* * * * *